United States Patent
Rose

(10) Patent No.: US 11,321,505 B1
(45) Date of Patent: May 3, 2022

(54) COMPLEX COMPONENT MODAL SYNTHESIS (CMS) METHOD AND MODAL SOLUTIONS

(71) Applicant: MSC.Software Corporation, Newport Beach, CA (US)

(72) Inventor: Theodore Lee Rose, Pasadena, CA (US)

(73) Assignee: Hexagon Manufacturing Intelligence, Inc., Irvine, CA (US)

( * ) Notice: Subject to any disclaimer, the term of this patent is extended or adjusted under 35 U.S.C. 154(b) by 356 days.

(21) Appl. No.: 16/387,226

(22) Filed: Apr. 17, 2019

(51) Int. Cl.
*G06F 30/20* (2020.01)
*G06F 17/16* (2006.01)
*G06F 111/10* (2020.01)

(52) U.S. Cl.
CPC .............. *G06F 30/20* (2020.01); *G06F 17/16* (2013.01); *G06F 2111/10* (2020.01)

(58) Field of Classification Search
CPC .............................. G06F 17/16; G06F 2111/10
USPC ............................................................. 703/2
See application file for complete search history.

(56) References Cited

U.S. PATENT DOCUMENTS

| | | | | |
|---|---|---|---|---|
| 4,750,147 A | * | 6/1988 | Roy, III | G01S 3/14 708/801 |
| 4,951,266 A | * | 8/1990 | Hsu | G01V 1/48 367/25 |
| 4,965,732 A | * | 10/1990 | Roy, III | G01S 3/14 342/147 |
| 6,584,413 B1 | * | 6/2003 | Keenan | G01J 3/28 702/194 |
| 6,675,106 B1 | * | 1/2004 | Keenan | G01J 3/28 702/194 |
| 2006/0008024 A1 | * | 1/2006 | Wight | H04B 7/0443 375/267 |
| 2006/0259283 A1 | * | 11/2006 | Brughmans | G06F 30/15 703/2 |
| 2008/0208496 A1 | * | 8/2008 | Habath | H02J 13/00002 702/77 |
| 2011/0200081 A1 | * | 8/2011 | Guo | H04B 7/0417 375/224 |
| 2013/0272444 A1 | * | 10/2013 | Barron | H03M 13/3746 375/295 |

(Continued)

OTHER PUBLICATIONS

Krattiger et al. (Interface Reduction for Hurty/Craig-Bampton Substructured Models: Review and Improvements, Elsevier, 2017, pp. 1-27) (Year: 2017).*

(Continued)

*Primary Examiner* — Iftekhar A Khan
(74) *Attorney, Agent, or Firm* — Foley & Lardner LLP

(57) ABSTRACT

Examples described herein relate to apparatuses and methods for a computer simulation platform to solve a computer model, including splitting complex vectors generated for the computer model into real components and imaginary components by generating a first matrix corresponding to real components and a second matric corresponding to imaginary components, generating an appended matrix by appending the first matrix to the second matrix, generating a set of real, orthogonal vectors by running the appended matrix through a residual vector logic, and performing a real arithmetic-based computer simulation solution using the set of real, orthogonal vectors.

15 Claims, 3 Drawing Sheets

(56) References Cited

U.S. PATENT DOCUMENTS

| | | | | |
|---|---|---|---|---|
| 2016/0189053 A1* | 6/2016 | Alboszta | ................ | G06N 10/00 706/46 |
| 2016/0210560 A1* | 7/2016 | Alboszta | ............... | H04L 43/062 |
| 2018/0373820 A1* | 12/2018 | Knezevic | .................. | G06F 7/64 |

OTHER PUBLICATIONS

Cui et al. (An eigenvector-based iterative procedure for free-interface component modal synthesis method, Int. J. Numer. Meth, Engn., 2018, pp. 1-20). (Year: 2018).*

Sarsri et al. (Dynamic analysis of large structures with uncertain parameters based on coupling component mode synthesis and perturbation method, Ain Shams Engineering Journal (2016) 7, 371-381) (Year: 2016).*

Etienne Balmès (Use of Generalized Interface Degrees of Freedom in Component Mode Synthesis, IMAC, 1996, pp. 1-7) (Year: 1996).*

Malcolm J. Smith (An Evaluation of Component Mode Synthesis for Modalanalysis of Finite Element MODELS,1993, The University of British Columbia, pp. 1-221) (Year: 1993).*

Wang et al. ("Complex Component Mode Synthesis for Damped Systems", Journal of Sound and Vibration , 1995, pp. 781-800) (Year: 1995).*

Liu et al. ("Component Synthesis Method for Transient Response of Nonproportionally Damped Structures", AIAA Journal, 2010, pp. 2556-2563) (Year: 2010).*

Kenji Kubomura ("Component Mode Synthesis for Damped Structures", AIAA journal, 1987, pp. 740-745) (Year: 1987).*

Ulf Sellgren ("Component Mode Synthesis—A method for efficient dynamic simulation of complex technical systems", VISP, 2003, pp. 1-27) (Year: 2003).*

* cited by examiner

COMPLEX COMPONENT MODAL SYNTHESIS (CMS) METHOD AND MODAL SOLUTIONS

BACKGROUND

Various real arithmetic-based solutions have been developed for computer simulation platforms to determine simulation results for computer models of various systems. Real arithmetic-based solutions use real vectors as inputs. The real arithmetic-based solutions are simple, intuitive, and efficient to implement on computer simulation platforms, and are based on the assumption that low damping occurs in the simulated systems. That is, a computer simulation platform that uses real vectors can approximate lowly damped systems with decent accuracy. However, in computer simulations, real vectors may not accurately model or otherwise represent simulated systems that exhibit high damping.

On the other hand, complex vectors (with imaginary components) have been developed for computer simulation platforms to accurately model or otherwise represent highly damped systems such as but not limited to, damped systems, control systems, mobile tests, transient responses (e.g., in spacecraft analysis and liftoff analysis), and so on. Given that complex vectors cannot be used as inputs to the real arithmetic-based solutions due to the presence of imaginary components, complex arithmetic-based solutions do not currently exist for computer simulation platforms.

SUMMARY

In some arrangements, a method for a computer simulation platform to solve a computer model includes splitting, by a transformation circuit, complex vectors generated for the computer model into real components and imaginary components by generating a first matrix corresponding to real components and a second matric corresponding to imaginary components, generating, by the transformation circuit, an appended matrix by appending the first matrix to the second matrix, generating, by the transformation circuit, a set of real, orthogonal vectors by running the appended matrix through a residual vector logic, and performing, by a simulation circuit, a real arithmetic-based computer simulation solution using the set of real, orthogonal vectors.

In some arrangements, a non-transitory computer-readable medium having computer-readable instructions, such that when executed, causes a processor of a computer simulation platform to solve a computer model by splitting complex vectors generated for the computer model into real components and imaginary components by generating a first matrix corresponding to real components and a second matric corresponding to imaginary components, generating an appended matrix by appending the first matrix to the second matrix, generating a set of real, orthogonal vectors by running the appended matrix through a residual vector logic, and performing a real arithmetic-based computer simulation solution using the set of real, orthogonal vectors.

In some arrangements, a computer simulation platform configured to solve a computer model includes an interface, a memory, and a processor. The processor is configured to split complex vectors generated for the computer model into real components and imaginary components by generating a first matrix corresponding to real components and a second matric corresponding to imaginary components, generate an appended matrix by appending the first matrix to the second matrix, generate a set of real, orthogonal vectors by running the appended matrix through a residual vector logic, and perform real arithmetic-based computer simulation solution using the set of real, orthogonal vectors.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
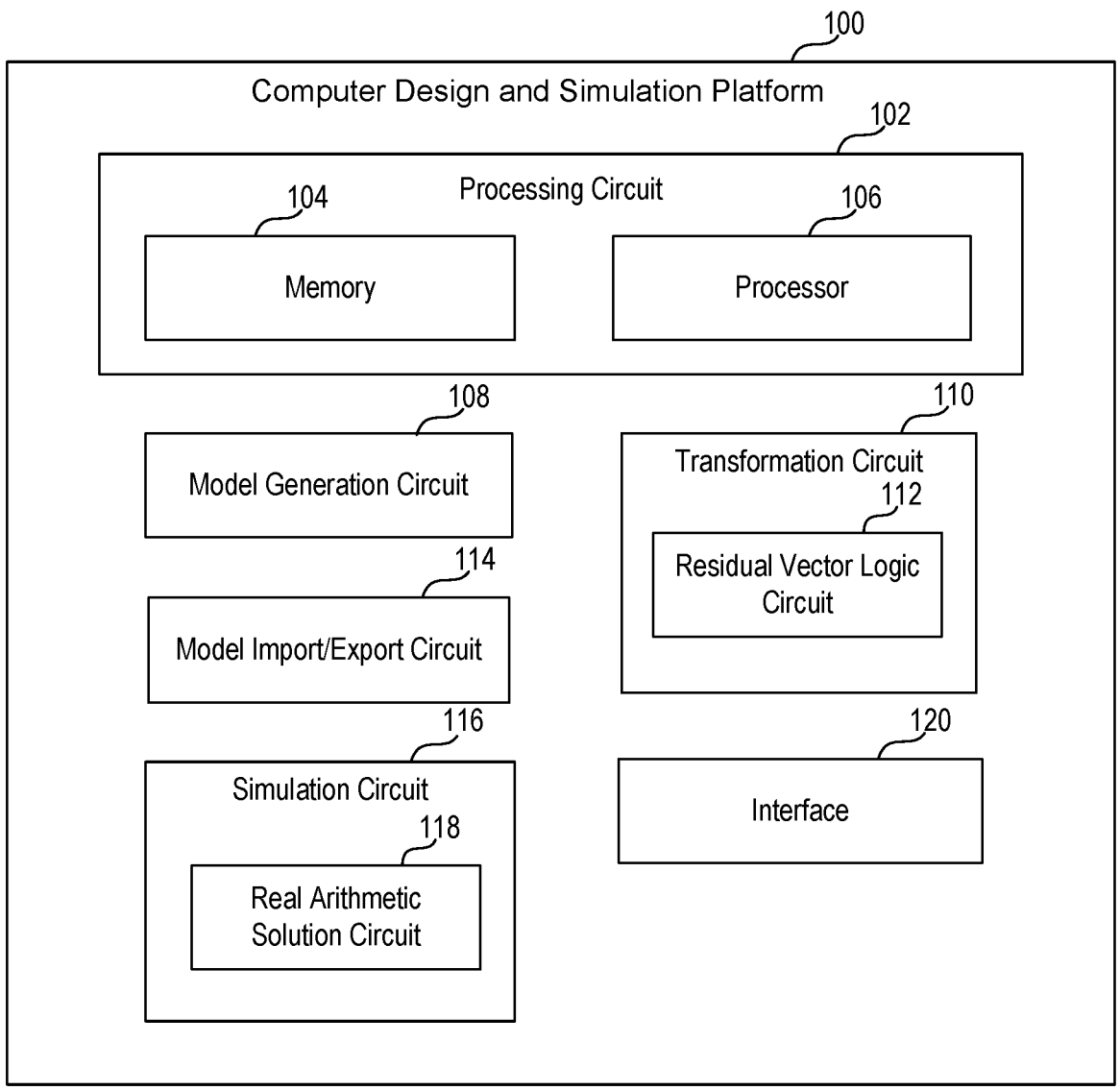
FIG. 1 is a block diagram illustrating an example of a computer design and simulation platform, according to some arrangements.

The detailed description set forth below in connection with the appended drawings is intended as a description of various aspects of the present disclosure and is not intended to represent the only aspects in which the present disclosure can be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure can be practiced without these specific details. In some instances, structures and devices are shown in block diagram form in order to avoid obscuring the concepts of the present disclosure. Acronyms and other descriptive terminology can be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more aspects.

Arrangements described herein relate to systems, apparatuses, methods, and non-transitory computer-readable medium for implementing a computer design and simulation platform/system configured to transform complex vectors that represent behaviors of a system into a set of real, orthogonal vectors via a residual vector logic. The set of real, orthogonal vectors transformed from the complex vectors can be used as inputs to real arithmetic-based solutions for a computer design and simulation platform. By transforming the complex vectors into the set of real, orthogonal vectors, the benefits of the complex vectors can be retained while the simple, intuitive, and efficient real arithmetic-based solutions can also be employed. In other words, in order to leverage the more accurate complex vectors for highly damped systems, the simple, intuitive, and efficient real arithmetic-based solutions are overhauled. Computer design and simulation platforms use complex vectors to accurately model or otherwise represent behaviors of highly damped systems such as but not limited to, damped systems, control systems, mobile tests, transient responses (e.g., in spacecraft analysis and liftoff analysis), and so on. The arrangements described herein bridge the gap between complex vectors and real arithmetic. That is, the arrangements described herein provides an interface for a type of input (e.g., complex vectors with imaginary components that accurately model or otherwise represent highly damped systems) to a computer design and simulation platform for a type of computer simulations (e.g., real arithmetic-based solutions).

Modal solutions are commonly used in computer simulations to reduce large-size models to relatively smaller representations that include important dynamics of the original model, in order to conserve time and computational resources (e.g., processing power and storage) for computer design and simulation. In addition to reducing the model size, modal reduction produces diagonal mass and stiffness matrices for solution calculation. Although modal reduction may capture most of the dynamic response of the structure, the static response may not be completely captured by modal reduction. This is due to modal truncation of higher frequency modes that may contribute statically to the total response.

Residual vectors are used to improve the results of modal solutions by accounting for the response of these higher frequency modes. Residual vectors can be determined from any set of base vectors. Although any vector can be used as a residual vector, as long as the residual vector is partially independent of the modal vectors, the residual vector may produce coupling with the modal vectors when added to the modes for matrix reduction. This coupling destroys the diagonal properties of the reduced mass and stiffness matrices and should be removed. Residual vectors can improve accuracy of modal approximation by removing linear dependencies of any base vectors, and orthogonalize the base vectors to make the base vectors appear as natural modes of the system. Modal approximation (or modal truncation) refers to linearly combining modes to model the solution.

A computer design and simulation platform as described herein is configured to execute component modal synthesis (CMS) analysis, which allows determination of behaviors of an assembly model based on behaviors of constituent models that make up the assembly model. The assembly model is a computer model of an assembly structure, which is a physical object. The constituent models are computer models of constituent elements of the assembly structure, where the constituent elements are physical objects. CMS analysis can be used in reduction. In CMS analysis on a computer design and simulation platform, a computer model is replaced by reduced matrices using calculated real eigenvalues of the computer model and other vectors. Residual vectors as described herein can be used in CMS analysis. Complex eigenvalues as described herein can be used in disciplines such as but not limited to, rotor-dynamics and highly damped structures. In addition, the arrangements described herein are used to determine modal solutions, which are solutions of problems using modal transformations.

FIG. 1 shows an example computer design and simulation platform 100 according to some arrangements. Referring to FIG. 1, the computer design and simulation platform 100 is configured to generate a set of real, orthogonal vectors from complex vectors, and using the set of real, orthogonal vectors in real arithmetic-based solutions. The computer design and simulation platform 100 includes at least a processing circuit 102, a model generation circuit 108, a transformation circuit 110, a model import/export circuit 114, a simulation circuit 116, and an interface 120 for implementing features described herein. In some arrangements, the computer design and simulation platform 100 is a part of a workstation computer or another suitable computing device. The computer design and simulation platform 100 may include other devices such as but not limited to, a network system, wireless or wired communications system, printers, and/or the like not shown for brevity.

The processing circuit 102 includes a memory 104 and a processor 106. The processor 106 includes any suitable data processing device, such as a general-purpose processor (e.g., a microprocessor). In the alternative, the processor 106 can be any conventional processor, controller, microcontroller, or state machine. The processor 106 can be implemented as a combination of computing devices, e.g., a combination of a Digital Signal Processor (DSP) and a microprocessor, a plurality of microprocessors, at least one microprocessor in conjunction with a DSP core, or any other such configuration. For example, the processor 106 may be, but is not limited to being, an Intel® designed processor, AMD® designed processor, Apple® designed processor, QUALCOMM® designed processor, or ARM® designed process.

The memory 104 (or storage device) can be operatively coupled to the processor 106 and can include any suitable device for storing software instructions and data for controlling and use by the processor 106 to perform operations and functions described herein. Examples of the memory 104 include, but not limited to, Random Access Memory (RAM), Read Only Memory (ROM), floppy disks, hard disks, dongles or other Recomp Sensor Board (RSB) connected memory devices, or the like. The memory 104 can include non-transitory storage media that is configured to store information and instructions pertinent to the operation of the processor 106.

The memory 104 can send data to or receive data from the processor 106 and/or each of the circuits/components 108-120 in the computer design and simulation platform 100. In some examples, the memory 104 can be a remote storage device that stores data for the computer design and simulation platform 100 (or only the processing circuit 102) in a different node of a network than that on which the rest of the computer design and simulation platform 100 reside. In some examples, the memory 104 can be located on the same computer system (e.g., within the same node of the network) as the rest of the computer design and simulation platform 100. In some examples, one or more of the circuits 108-120 can be implemented with a dedicated memory unit that is separate from the memory 104.

The model generation circuit 112 is configured to receive user input from the interface 120 and to convert the user input into a computer model, which can be simulated by the simulation circuit 116. The model generation circuit 112 can generate at least a finite element model of a physical object. The computer model can be a highly damped system, and can be represented by a set of complex vectors (complex modes). In some examples, the complex vectors are complex eigenvectors. The complex vectors (complex modes) include both real and imaginary components. The model generation circuit 112 can send model information corresponding to the generated model to one or more of the circuits/components 110 and 116-120 in the computer design and simulation platform 100. The model generation circuit 112 can be implemented using the processing circuit 102 or using a dedicated processing circuit such as but not limited to, the processing circuit 102.

The model import/export circuit 114 is configured to import a computer model from a memory device (e.g., the memory 104 or another suitable memory device of the computer design and simulation platform 100) or from a system other than the computer design and simulation platform 100. The model import/export circuit 114 can import at least a finite element model of a physical object. The computer model imported by the model import/export circuit 114 can be a highly damped system, and can be represented by a set of complex vectors (complex modes). In some examples, the complex vectors are complex eigenvectors. The complex vectors (complex modes) include both real and imaginary components. The model import/export circuit 114 can send model information corresponding to the imported model to one or more of the circuits/components 110 and 116-120 in the computer design and simulation platform 100. The model import/export circuit 114 can export a computer model to a memory device (e.g., the memory 104 or another suitable memory device of the computer design and simulation platform 100) or from a system other than the computer design and simulation platform 100. The model import/export circuit 114 can export the model via a suitable computer network to a machine to automatically manufacture products represented by the model. The model import/export circuit 114 can be implemented using the processing circuit 102 or using a dedicated processing circuit such as but not limited to, the processing circuit 102.

The transformation circuit 110 is configured to transform or convert complex vectors (complex modes) of a generated or imported computer model into a set of real, orthogonal vectors in the manner described herein. For instance, the transformation circuit 110 is configured to split the complex vectors into real components and imaginary components, such that the real components are represented by a first matrix and the imaginary components are represented by a second matrix. Both the first and second matrices are real matrices (containing real numbers). Furthermore, the transformation circuit 110 is configured to generate an appended matrix by combining the first and second matrices (e.g., appending the first matrix to the second matrix, or vice versa). In some examples, the transformation circuit 110 includes a residual vector logic circuit 112 configured to generate a set of real, orthogonal vectors using the appended matrix in the manner described herein. The transformation circuit 110 (and the residual vector logic circuit 112) can be implemented using the processing circuit 102 or using a dedicated processing circuit such as but not limited to, the processing circuit 102.

The simulation circuit 116 is configured to receive a computer model and performs simulations for the computer model. For example, the simulation circuit 116 includes a real arithmetic solution circuit 118 configured to receive the real, orthogonal vectors generated by the transformation circuit 110 and perform real arithmetic-based solutions for the computer model represented by the real, orthogonal vectors. Examples of the real arithmetic-based solutions include but are not limited to, CMS, transient response analysis, structural analysis, modal solutions, and so on. In some examples, the real arithmetic solutions configured to be executed by the simulation circuit 116 are configured to receive real, orthogonal vectors instead of complex vectors (complex modes). The simulation circuit 116 can be implemented using the processing circuit 102 or using a dedicated processing circuit such as but not limited to, the processing circuit 102.

The interface 120 can include at least one input device for receiving user input from a user and at least one display device for outputting information to the user. For example, the input device can include a computer with a monitor, keyboard, keypad, mouse, microphone, joystick, touch screen display, or other input devices performing a similar function. The keyboard can include alphanumeric and other keys, and can be connected to processing circuit 102 for communicating information and command selections. The input device can include a touch screen interface or movement sensing interface that can be combined with, or separated from, the display device of the interface 120. The input device can include a cursor control device, such as, but not limited to, a mouse, trackball, touch screen, motion sensor, cursor direction keys, and the like. Such input device can control cursor movement on the display device. The display device of the interface 120 can be any type of display (e.g., Cathode Ray Tube (CRT) display, a Liquid Crystal Display (LCD), a light-emitting diode (LED) display, plasma, Organic LED (OLED), etc.) and/or speakers configured to provide visual and/or audio output to the user.

Figure 2:
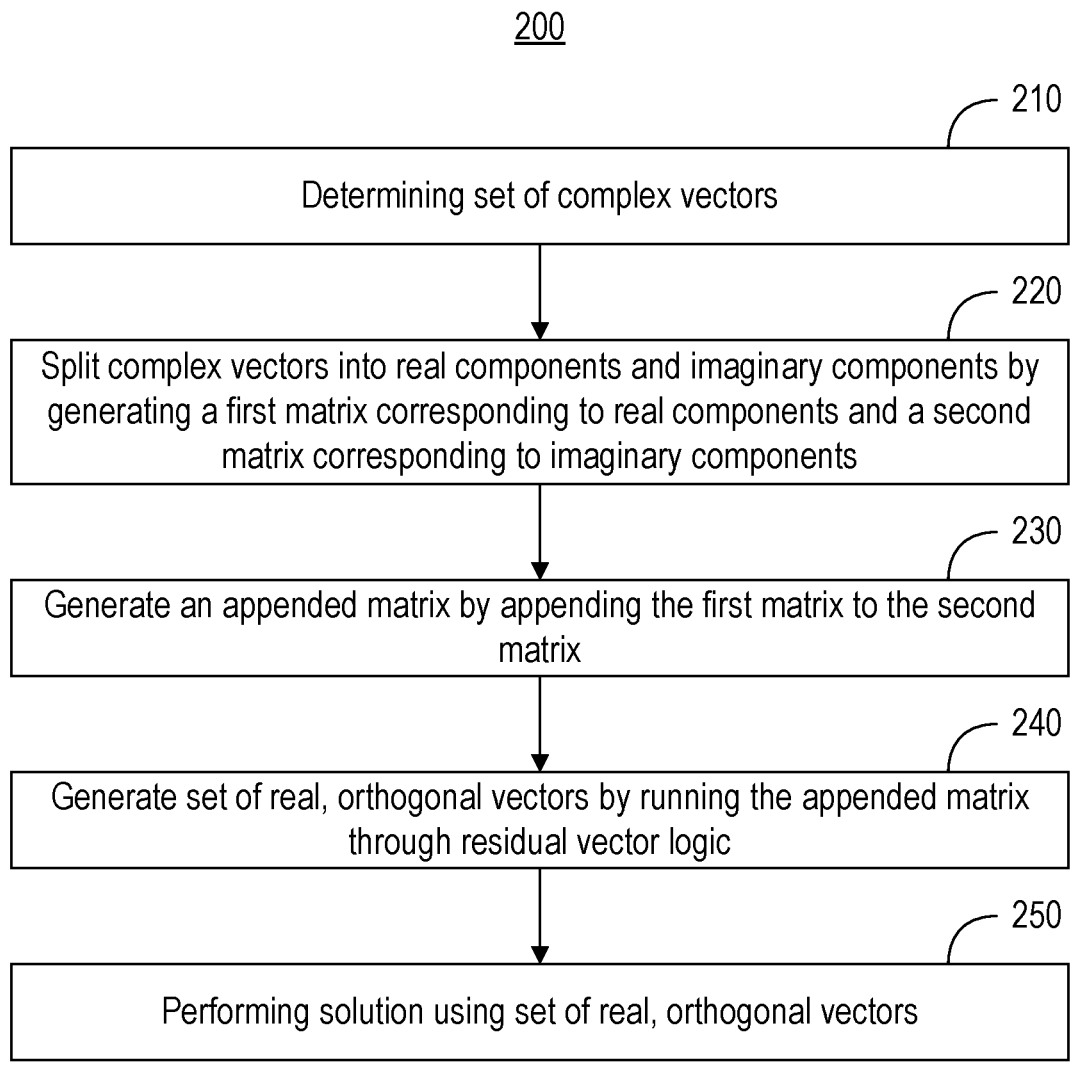
FIG. 2 is a process flow diagram illustrating an example method for the computer design and simulation platform (FIG. 1) to solve a computer model using real arithmetic based on real (residual) vectors according to some arrangements.

FIG. 2 shows an example method 200 for the computer design and simulation platform 100 (FIG. 1) to solve a computer model using real arithmetic based on real (residual) vectors according to some arrangements. Referring to FIGS. 1-2, the method 200 is concerned with generating a set of real, orthogonal vectors from complex vectors, and using the set of real, orthogonal vectors in real arithmetic-based solutions.

At 210, a set of complex vectors (complex modes) are determined for a computer model of a system. The computer model can be generated by the model generation circuit 112 or imported by the model import/export circuit 114. Examples of the system include but are not limited to, damped or highly damped systems, control systems, mobile tests, transient responses (e.g., in spacecraft analysis and liftoff analysis), and so on. In some examples, the complex vectors are complex eigenvectors. The complex vectors or complex modes include both real and imaginary components. In some examples, a complex eigenvalue solution is performed using the model generation circuit 112 to determine complex eigenvectors and writes the complex eigenvectors to a file stored in the memory 104. The stored complex eigenvectors are read from the file to be processed to generate the real, orthogonal vectors as described herein. The set of complex vectors (eigenvectors) can be determined for the computer model using the Hessenberg method in some examples.

At 220, the complex vectors are split by the transformation circuit 110 into real components and imaginary components. A first matrix corresponding to the real components and a second matrix corresponding to imaginary component are created by splitting the complex vectors into the real components and the imaginary components. The first matrix and the second matrix are real. That is, the first matrix and the second matrix only contain elements that are real numbers. For example, terms in a complex matrix [A] representing the complex vectors have a form such as but not limited to:

$$A_j = X_j + Y_j * i \tag{1};$$

where $i = \sqrt{-1}$. Thus, the complex matrix [A] can be represented by real terms [X] and imaginary terms [Y], where $$[A] = [X] + [Y]i \tag{2}.$$

such that [X] and [Y] are real matrices with coefficients of the complex matrix [A]. The transformation circuit 110 is configured to split [A], which is a complex matrix, into [X] and [Y], which are the first and second matrices, respectively.

At 230, the transformation circuit 110 generates an appended matrix by appending the first matrix to the second matrix, or vice versa. In one example, the real matrix [Y] can be appended to the real matrix [X] to obtain real matrix [X:Y]. In another example, the real matrix [X] can be appended to the real matrix [Y] to obtain real matrix [Y:X].

At 240, the appended matrix is run through residual vector logic to generate a set of real, orthogonal vectors. The transformation circuit 110 (e.g., the residual vector logic circuit 112) is configured to generate the set of real, orthogonal vectors from the appended matrix. For example, one or more real modes can be generated using the residual vector logic, and multiple residual vectors can be generated using the one or more real modes. The set of real and orthogonal vectors can be used to improve accuracy of the solution because those vectors appear like modes. Real and orthogonal vectors can be used in efficient real arithmetic-based methods/solutions.

The real, orthogonal vectors generated at 240 can be linearly combined to obtain the original complex vectors generated at block 210. For example, the computer model can be converted to modal coordinates using the real, orthogonal vectors and solves a reduced complex eigenvalue problem or performs a modal complex eigenvalue solution to obtain the original complex modes (e.g., the complex vectors generated at block 210). Modal complex eigenvalue solution can be performed to verify (by the transformation circuit 110) that the real, orthogonal vectors are capable of calculating the complex modes (e.g., the complex vectors generated at block 210).

At 250, the simulation circuit 116 (e.g., the real arithmetic solution circuit 118) uses the real, orthogonal vectors to perform the solution such as but not limited to, real arithmetic-based solutions. Examples of such solutions include but are not limited to, CMS, transient response analysis, structural analysis, modal solutions, and so on.

Thus, the real, orthogonal vectors can be used in real arithmetic-based solutions (e.g., CMS or transient response analysis) without any modification to the solution logic itself. As described, the solution logic can be executed by the real arithmetic solution circuit 118. Various known real arithmetic-based solutions can efficiently (in terms of computer simulation processing time and processing/storage resources) and accurately predict behaviors of the computer model represented by real, orthogonal vectors. Complex vectors (complex modes) cannot be directly used in such real arithmetic-based solutions without modifying the solution logic given that complex vectors and complex modes have imaginary numbers and require complex arithmetic-based solutions. In the case of CMS, a component of the computer model can be reduced using the residual vectors, resulting in real matrices. As such, by transforming the complex vectors into real, orthogonal vectors, the computer design and simulation platform 100 can use known efficient and accurate real arithmetic-based solutions for systems that are better represented by the complex vectors.

In some examples, a postprocessor implemented by the interface 120 and the processing circuit 102 can be configured to visualize the solution. For example, the interface 120 is configured to display the solution results to the user.

Figure 3:
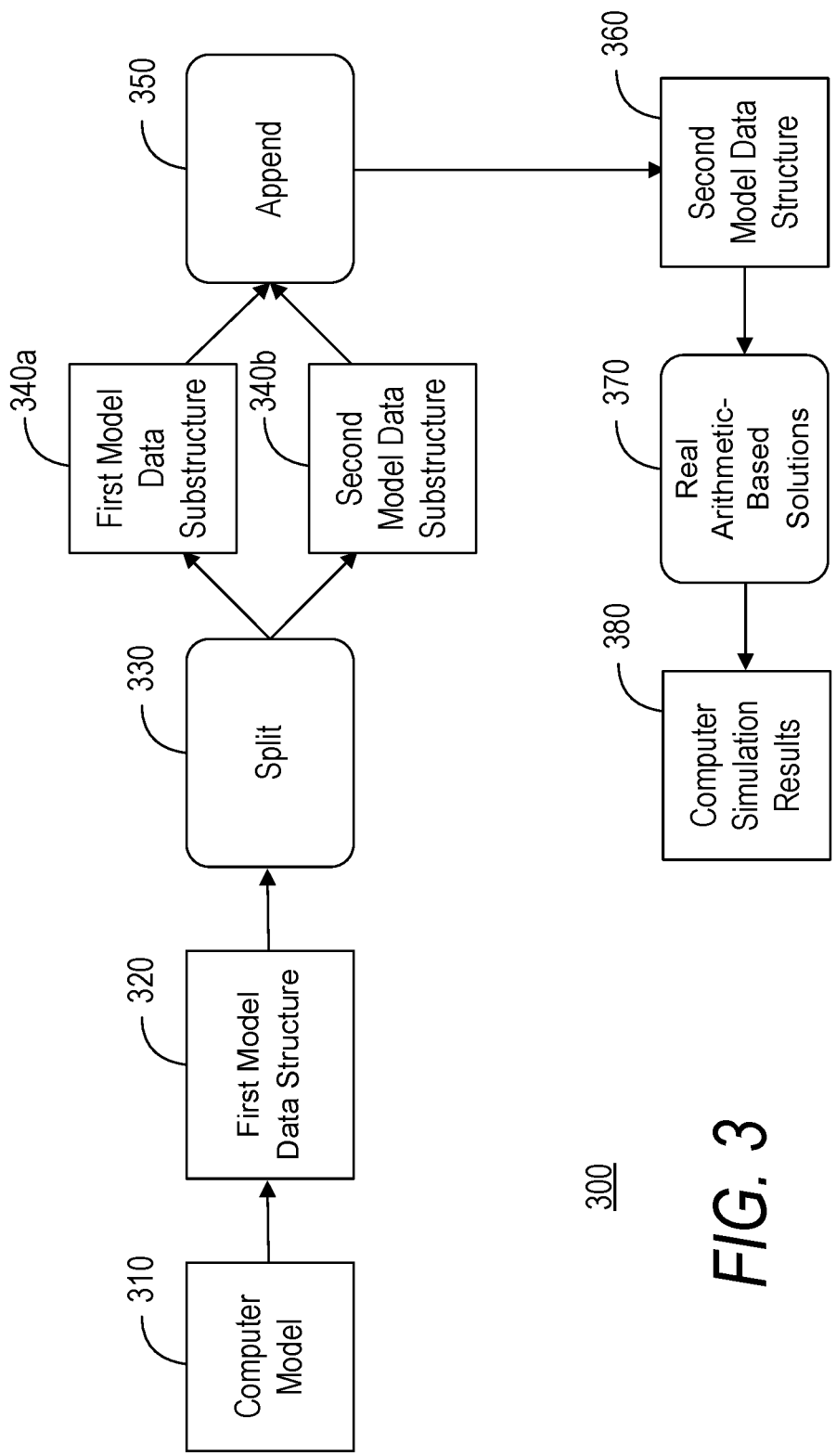
FIG. 3 is a diagram illustrating an example method for the computer design and simulation platform (FIG. 1) to solve a computer model using real arithmetic based on real (residual) vectors according to some arrangements.

FIG. 3 is a diagram 300 illustrating the computer design and simulation platform 100 (FIG. 1) solving a computer model 310 using real arithmetic based on real (residual) vectors according to some arrangements. Referring to FIGS. 1-3, blocks with sharp corners denote data or data structure/format while blocks with rounded corners denote processes/operations. The diagram 300 corresponds to the method 200 in some examples. As shown in the diagram 300, the computer model 310 of a physical object is initially represented by a first model data structure 320, which is a set of complex vectors (complex modes). Representing the computer model 310 using the first model data structure 320 allows damped or highly damped systems corresponding to the physical object to be accurately modeled or otherwise represented in computer simulation platforms.

The first model data structure 320 is transformed into a second model data structure 360 that can be used in various real arithmetic-based solutions. For example, at 330, the transformation circuit 110 splits the first model data structure 320 into two components, a first model data substructure 340a and a second model data substructure 340b. The first model data substructure 340a corresponds to real components of the complex vector of the first model data structure 320. The second model data substructure 340b corresponds to imaginary components of the complex vector of the first model data structure 320. In some examples, both the first model data substructure 340a and the second model data substructure 340b are real matrices that contain only real numbers (and no imaginary numbers). At 350, the transformation circuit 110 appends the first model data substructure 340a and the second model data substructure 340b together to generate a second model data structure 360. The second model data structure 360 corresponds to real, orthogonal vectors. The second model data structure 360 are used as the input to real arithmetic-based solutions 370 to generate computer simulation results 380.

As such, the flow shown in diagram 300 transforms the first model data structure 320 into the second model data structure 360 so that the parameters that represent the computer model 310 are transformed from a data format that is typically not capable of being accepted by the real arithmetic-based solutions 370 into a different data format that can be accepted by the real arithmetic-based solutions 370. The real arithmetic-based solutions 370 may be pre-existing solutions or computer functions optimized in terms of simulation time and resource (e.g., computer processing power and computer storage). Thus, by transforming the first model data structure 320 into the second model data structure 360, efficient real arithmetic-based solutions 370 can be used on a data structure that represents the compute model 310 and is accepted by the real arithmetic-based solutions 370.

In some arrangements, the computer simulation results 380 can be displayed to a user for assist the user in designing the physical object virtually by allowing the user to visualize the behavior or response of the physical object virtually through displaying the computer simulation results 380. The user can modify the computer model 310 using the interface 120. The interface 120 receives the user input corresponding to modifying the computer model 310, and executes the flow shown in the diagram 300 again to determine updated simulation results. In some arrangements, the computer model 310, after a few iterations, can be used as blueprints for manufacturing the physical object corresponding to the computer model 310.

The terms "system," "logic," "module," "data processing apparatus," or "computing device" encompasses all kinds of circuits, apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

The construction and arrangement of the systems and methods as shown in the various exemplary examples are illustrative only. Although only a few examples have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. Other substitutions, modifications, changes, and omissions can be made in the design, operating conditions and arrangement of the exemplary examples without departing from the scope of the present disclosure.

The present disclosure contemplates methods, systems and program products on any machine-readable media for accomplishing various operations. The examples of the present disclosure can be implemented using existing computer processors, or by a special purpose computer processor for an appropriate system, incorporated for this or another purpose, networked systems or by a hardwired system. Examples within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium.

Combinations of the above are also included within the scope of machine-readable media. Machine-executable instructions include, for example, instructions and data which cause a general purpose computer, special purpose computer, or special purpose processing machines to perform a certain function or group of functions. The machine-executable instructions can be executed on any type of computing device (e.g., computer, laptop, etc.) or can be embedded on any type of electronic device (e.g., a portable storage device such as a flash drive, etc.).

Although the figures can show a specific order of method steps, the order of the steps can differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision step.

What is claimed is:

1. A method for a computer simulation platform to solve a computer model, the method comprising:
   importing the computer model;
   splitting, by a transformation circuit, complex vectors generated for the computer model into real components and imaginary components by generating a first matrix corresponding to real components and a second matrix corresponding to imaginary components, wherein the complex vectors are complex eigenvectors determined using a complex eigenvalue solution;
   generating, by the transformation circuit, an appended matrix by appending the first matrix to the second matrix;
   generating, by the transformation circuit, a set of real, orthogonal vectors by running the appended matrix through a residual vector logic;
   performing, by a simulation circuit, a real arithmetic-based computer simulation solution using the set of real, orthogonal vectors as inputs to the real arithmetic-based computer simulation solution;
   displaying, by an interface, results of the real arithmetic-based computer simulation.

2. The method of claim 1, wherein the complex vectors comprise the real components and the imaginary components.

3. The method of claim 1, wherein the first matrix and the second matrix are real matrices.

4. The method of claim 1, wherein linear combination of the set of real, orthogonal vectors results in the complex vectors.

5. The method of claim 1, further comprising verifying that the set of real, orthogonal vectors are capable of calculating the complex vectors.

6. The method of claim 5, wherein verifying that the set of real, orthogonal vectors are capable of calculating the complex vectors comprises:
   converting the computer model to modal coordinates using the set of real, orthogonal vectors; and
   performing the complex eigenvalue solution.

7. The method of claim 1, wherein the real arithmetic-based computer simulation solution comprises at least one of component modal synthesis (CMS) analysis, transient response analysis, structural analysis, or modal solutions.

8. A non-transitory computer-readable medium having computer-readable instructions, such that when executed, causes a processor of a computer simulation platform to solve a computer model by:
   importing the computer model;
   splitting complex vectors generated for the computer model into real components and imaginary components by generating a first matrix corresponding to real components and a second matrix corresponding to imaginary components, wherein the complex vectors are complex eigenvectors determined using a complex eigenvalue solution;

generating an appended matrix by appending the first matrix to the second matrix;

generating a set of real, orthogonal vectors by running the appended matrix through a residual vector logic;

performing a real arithmetic-based computer simulation solution using the set of real, orthogonal vectors as inputs to the real arithmetic-based computer simulation solution;

displaying results of the real arithmetic-based computer simulation.

9. The non-transitory computer-readable medium of claim 8, wherein the complex vectors comprise the real components and the imaginary components.

10. The non-transitory computer-readable medium of claim 8, wherein the first matrix and the second matrix are real matrices.

11. The non-transitory computer-readable medium of claim 8, wherein linear combination of the set of real, orthogonal vectors results in the complex vectors.

12. The non-transitory computer-readable medium of claim 8, wherein the processor is further configured to verify that the set of real, orthogonal vectors are capable of calculating the complex vectors.

13. The non-transitory computer-readable medium of claim 12, wherein verifying that the set of real, orthogonal vectors are capable of calculating the complex vectors comprises:

converting the computer model to modal coordinates using the set of real, orthogonal vectors; and performing the complex eigenvalue solution.

14. The non-transitory computer-readable medium of claim 8, wherein the real arithmetic-based computer simulation solution comprises at least one of component modal synthesis (CMS) analysis, transient response analysis, structural analysis, or modal solutions.

15. A computer simulation platform configured to solve a computer model, the computer simulation platform comprises:

an interface;

a memory; and a processor configured to:

importing the computer model;

split complex vectors generated for the computer model into real components and imaginary components by generating a first matrix corresponding to real components and a second matrix corresponding to imaginary components, wherein the complex vectors are complex eigenvectors determined using a complex eigenvalue solution;

generate an appended matrix by appending the first matrix to the second matrix;

generate a set of real, orthogonal vectors by running the appended matrix through a residual vector logic;

perform real arithmetic-based computer simulation solution using the set of real, orthogonal vectors as inputs to the real arithmetic-based computer simulation solution;

display results of the real arithmetic-based computer simulation.

* * * * *